(No Model.)
W. H. WHEELER.
COMBINED HOE, RAKE, AND CULTIVATOR.
No. 556,389. Patented Mar. 17, 1896.
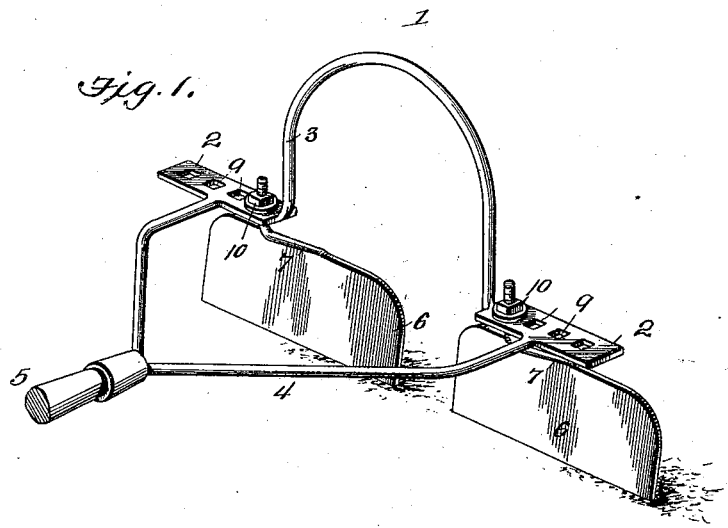
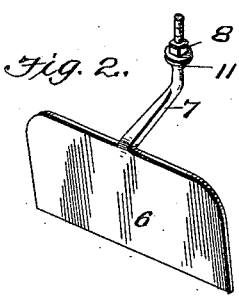
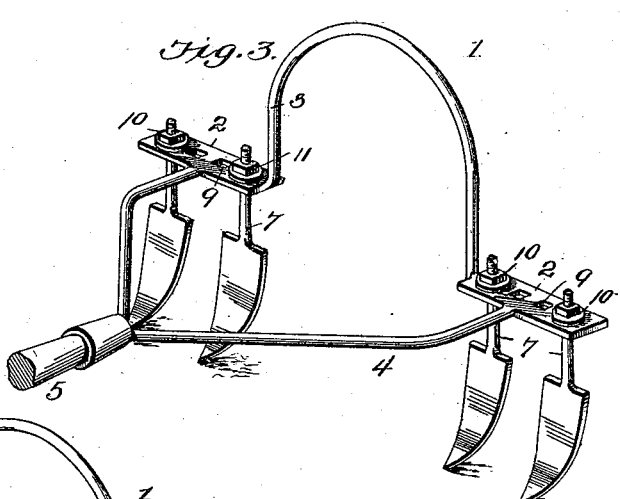
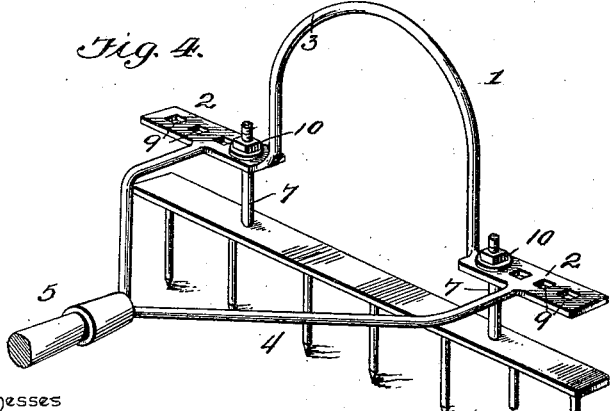
Witnesses
Jos. B. Stack
Inventor
William H. Wheeler
By his Attorneys,
C. A. Snow & Co.

UNITED STATES PATENT OFFICE.

WILLIAM H. WHEELER, OF WEST PLAINS, MISSOURI, ASSIGNOR OF TWO-THIRDS TO J. LEE PAUL AND ROBERT G. GREEN, OF SAME PLACE.

COMBINED HOE, RAKE, AND CULTIVATOR.

SPECIFICATION forming part of Letters Patent No. 556,389, dated March 17, 1896.

Application filed August 28, 1894. Serial No. 521,507. (No model.)

*To all whom it may concern:*

Be it known that I, WILLIAM H. WHEELER, a citizen of the United States, residing at West Plains, in the county of Howell and State of Missouri, have invented a new and useful Hand Agricultural Implement, of which the following is a specification.

My invention relates to cultivating-tools, and particularly to a device for use in cultivating cotton, and the objects in view are to provide a simple and efficient tool adapted for carrying a plurality of blades, whereby in the cultivation of cotton or analogous plants the work of two or more strokes may be accomplished by a single movement, to provide means for the relative adjustment of the bits or blades to suit the width of the stand of cotton or other plants, and, furthermore, to provide means for the attachment of a number of bits or blades of different kinds and designed for different purposes to a single stock or frame.

Further objects and advantages of the invention will appear in the following description, and the novel features thereof will be particularly pointed out in the appended claim.

In the drawings, Figure 1 is a perspective view of a tool embodying my invention provided with a plurality of hoe-blades and adapted particularly for use in the cultivation of cotton. Fig. 2 is a detail view of one of the hoe-blades. Fig. 3 is a perspective view of the tool provided with plow-bits designed for general cultivation. Fig. 4 is a similar view of the tool provided with a rake-bit.

Similar numerals of reference indicate corresponding parts in all the figures of the drawings.

The body portion or frame 1 of the improved tool consists of the transversely-aligned bars 2, connected by an interposed arch 3, adapted especially for passing over a stand of cotton or other plants. Attached to this frame and combining therewith to form a stock is the yoke 4, to which is attached a handle 5 of the usual or any approved form. Attached to this stock are the bits or blades, and as the latter are preferably removably attached they are interchangeable to suit the character of the work to be performed.

In Fig. 1 I have shown hoe-blades attached to the stock, said blades 6 being provided with shanks 7, having squared or angular portions 8 to fit in angular openings 9 in the bars 2, and being threaded and engaged above the plane of the bars by nuts 10. Shoulders 11 are formed on the shanks to bear against the lower surfaces of the bars. In order to provide for the relative lateral adjustment of the bits, it is preferable to provide the stock with a series of openings 9, or the equivalent thereof, such as elongated openings or slots.

In Fig. 3 I have shown plow-bits attached to the stock in place of the hoe-bits, a plurality thereof being employed, and in Fig. 4 I have shown a rake-bit arranged in operative position. These are only a few of the various forms of bits which may be used in connection with the improved tool, but a sufficient number has been illustrated to indicate the means for applying and adjusting the same to suit different kinds of work to be performed. It is obvious in this connection that in addition to the increased convenience of a tool of this kind, and the advantage of the lateral adjustment of the blades, the combination-tool can be manufactured at less cost than a number of tools equivalent to those into which the improved device may be converted. It will be seen, furthermore, that in cultivating cotton or the like both sides of the stand may be hoed simultaneously, thus reducing the number of strokes necessary to produce the same effect, and therefore resulting in a saving of time to the operator. It is apparent, also, that various changes in the form, proportion, and minor details of construction may be resorted to without departing from the spirit or sacrificing any of the advantages of the invention.

The yoke 4 comprises divergent members which have the transversely-aligned bars 2 formed on the divergent ends, and which have the convergent ends terminating in a socket, to which is secured the handle 5. The arch 3 simply braces the transverse bars 2 against lateral movements and supplements the action of the divergent members of the yoke 4.

In Fig 4 it will be seen that the rake-head, having connection near its ends with the bars 2, braces the same laterally and stiffens and strengthens the divergent members of the yoke 4, and said rake-head can be comparatively light because the arch 3 assists in preventing any lateral movement of the bars 2.

Having thus described my invention, I claim—

In a hand implement of the character specified, the frame herein shown and described, formed of a yoke comprising divergent members having cross-bars integrally formed therewith at their outer ends, said cross-bars being transversely aligned and provided with a series of angular openings, a handle firmly attached to the inner or convergent ends of the yoke members, the handle, yoke and cross-bars being in substantially the same plane, and a connecting-arch for bracing the said transversely-aligned cross-bars, said frame adapted to receive various cultivating devices provided with shank portions formed with shoulders to engage with the under side of the cross-bars, with angular parts to fit within the said angular openings, and with threaded extremities to receive binding-nuts, substantially as set forth.

In testimony that I claim the foregoing as my own I have hereto affixed my signature in the presence of two witnesses.

WILLIAM H. WHEELER.

Witnesses:
C. F. FUNKHOUSER,
ELI E. THORNBURGH.